(12) United States Patent
Xiang et al.

(10) Patent No.: US 12,547,247 B2
(45) Date of Patent: Feb. 10, 2026

(54) ELECTRONIC APPARATUS, HEART RATE DETECTION METHOD, AND COMPUTER-READABLE STORAGE MEDIUM

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Lian Xiang, Beijing (CN); Yuan Fang, Beijing (CN); Jiaxiang Zhang, Beijing (CN); Yakun Kong, Beijing (CN); Gong Chen, Beijing (CN); Zheng Bao, Beijing (CN); Kang Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/843,148

(22) PCT Filed: Sep. 13, 2023

(86) PCT No.: PCT/CN2023/118651
§ 371 (c)(1),
(2) Date: Aug. 30, 2024

(87) PCT Pub. No.: WO2025/054866
PCT Pub. Date: Mar. 20, 2025

(65) Prior Publication Data
US 2026/0023431 A1 Jan. 22, 2026

(51) Int. Cl.
G09G 3/20 (2006.01)
A61B 5/1172 (2016.01)
(Continued)

(52) U.S. Cl.
CPC ............ *G06F 3/015* (2013.01); *A61B 5/1172* (2013.01); *G06F 3/0416* (2013.01);
(Continued)

(58) Field of Classification Search
CPC ... G06F 3/015; G06F 3/0416; G06V 40/1318; A61B 5/1172; G09G 3/20;
(Continued)

(56) References Cited

U.S. PATENT DOCUMENTS 8,408,456 B2 * 4/2013 Weintraub .............. G06F 21/32
235/382
8,538,095 B2 * 9/2013 Fedele ............... G06V 40/1359
382/199
(Continued)

FOREIGN PATENT DOCUMENTS

CN 114081464 A 2/2022
CN 114680855 A 7/2022
(Continued)

*Primary Examiner* — Sejoon Ahn
(74) *Attorney, Agent, or Firm* — The Webb Law Firm

(57) ABSTRACT

An electronic apparatus includes a fingerprint recognition module, a touch controller, a processor, a display driver and a display module. The touch controller is configured to send a first control signal to the fingerprint recognition module in response to a heart rate detection instruction to control the fingerprint recognition module to collect blood flow information. The processor is configured to obtain the blood flow information and determine heart rate information based on the blood flow information, and generate a second control signal based on the heart rate information and send the second control information to the display driver. The display driver is configured to generate a first display driving signal based on the second control signal to control the display module to alternately display a first image and a second
(Continued)

image, a switching frequency of the first image and the second image matching the heart rate information.

18 Claims, 7 Drawing Sheets

(51) Int. Cl.
  *G06F 3/01* (2006.01)
  *G06F 3/041* (2006.01)
  *G06V 40/13* (2022.01)
(52) U.S. Cl.
  CPC ........... *G06V 40/1318* (2022.01); *G09G 3/20* (2013.01); *G09G 2320/0626* (2013.01); *G09G 2340/0435* (2013.01); *G09G 2354/00* (2013.01)
(58) Field of Classification Search
  CPC ... G09G 2320/0626; G09G 2340/0435; G09G 2354/00
  See application file for complete search history.

(56) References Cited

U.S. PATENT DOCUMENTS

| | | | | |
|---|---|---|---|---|
| 2010/0309332 | A1* | 12/2010 | Ueda | H04N 23/73 348/E5.037 |
| 2010/0329561 | A1* | 12/2010 | Sakai | H04N 23/81 382/173 |
| 2011/0170750 | A1* | 7/2011 | Kropp | A61B 5/02444 382/124 |
| 2013/0100081 | A1 | 4/2013 | Gu et al. | |
| 2014/0142403 | A1 | 5/2014 | Brumback et al. | |
| 2014/0267659 | A1* | 9/2014 | Lyon | G06V 10/98 348/77 |
| 2017/0053592 | A1 | 2/2017 | Shin et al. | |
| 2019/0384442 | A1* | 12/2019 | Bjerre | G06F 3/0383 |
| 2022/0254185 | A1 | 8/2022 | Chou et al. | |

FOREIGN PATENT DOCUMENTS

| | | |
|---|---|---|
| CN | 116048368 A | 5/2023 |
| KR | 1020150083000 A | 7/2015 |
| WO | 2022126665 A1 | 6/2022 |
| WO | 2023273834 A1 | 1/2023 |
| WO | 2023160194 A1 | 8/2023 |
| WO | 2023165482 A1 | 9/2023 |

* cited by examiner

ELECTRONIC APPARATUS, HEART RATE DETECTION METHOD, AND COMPUTER-READABLE STORAGE MEDIUM

CROSS-REFERENCE TO RELATED APPLICATION

This application is the United States national phase of International Patent Application No. PCT/CN2023/118651, filed Sep. 13, 2023, the disclosure of which is hereby incorporated by reference in its entirety.

BACKGROUND OF THE INVENTION

Field of the Invention

The present disclosure relates to the field of terminal technologies, and in particular, to an electronic apparatus, a heart rate detection method and a computer-readable storage medium.

Description of Related Art

Heart rate refers to the frequency of heart beats, i.e., the number of times the heart beats per minute. Heart rate may vary depending on age, gender and other physiological conditions, and there are significant individual differences in resting heart rate. With the development of terminal equipment technology, terminal devices are becoming more and more multi-functional and intelligent. At present, the terminal device may be used to detect the user's heart rate information. The heart rate detection function of the terminal device is usually achieved based on a sensor and other hardware. A vibration signal of the heart is converted into a corresponding electrical signal by the sensor, and then, the heart rate is determined based on the period of peak values of the electrical signal.

SUMMARY OF THE INVENTION

In an aspect, an electronic apparatus is provided. The electronic apparatus includes a fingerprint recognition module, a touch controller, a processor, a display driver and a display module. The touch controller is configured to send a first control signal to the fingerprint recognition module in response to a heart rate detection instruction to control the fingerprint recognition module to collect blood flow information in blood vessels of a user. The processor is configured to obtain the blood flow information in blood vessels of the user and determine heart rate information of the user based on the blood flow information, and to generate a second control signal based on the heart rate information and send the second control information to the display driver. The display driver is configured to generate a first display driving signal based on the second control signal to control the display module to alternately display a first image and a second image, a switching frequency of the first image and the second image matching the heart rate information.

In some embodiments, the first display driving signal includes multiple display periods, and each display period includes a display time of the first image and a display time of the second image. Within a display period of the multiple display periods, a display luminance of the first image is different from a display luminance of the second image.

In some embodiments, the first display driving signal includes data signals, a ratio of a duty ratio of each data signal corresponding to the first image to a duty ratio of a respective data signal corresponding to the second image is same, and the ratio is not equal to 1.

In some embodiments, a data voltage value corresponding to each data signal corresponding to the first image is different from a data voltage value corresponding to each data signal corresponding to the second image.

In some embodiments, the first display driving signal includes light-emitting control signals, a ratio of a duty ratio of each light-emitting control signal corresponding to the first image to a duty ratio of a respective light-emitting control signal corresponding to the second image is same, and the ratio is not equal to 1.

In some embodiments, a duration of each light-emitting control signal corresponding to the first image is not equal to a duration of each light-emitting control signal corresponding to the second image.

In some embodiments, a number of operation levels of each light-emitting control signal corresponding to the first image is not equal to a number of operation levels of each light-emitting control signal corresponding to the second image.

In some embodiments, within a display period, the first image and the second image display different contents.

In some embodiments, the processor is further configured to obtain a heart rate parameter of the user within a set period based on the heart rate information of the user, generate a third control signal containing the heart rate parameter and send the third control signal to the display driver; the display driver is further configured to generate a second display driving signal based on the third control signal to control the display module to display an image containing the heart rate parameter on the first image and/or the second image.

In some embodiments, an area of the image containing the heart rate parameter is less than an area of the first image and/or an area of the second image.

In some embodiments, within a display period, a display luminance of the image containing the heart rate parameter remains unchanged.

In some embodiments, the fingerprint recognition module is configured to collect multiple images containing the blood flow information; and after the processor determines the heart rate information of the user, the touch controller is further configured to obtain a frame rate of the multiple images containing the blood flow information and send the frame rate to the processor; the processor is further configured to send a vertical synchronization signal to the display driver, where the vertical synchronization signal is used to indicate the frame rate of the multiple images containing the blood flow information; the display driver is further configured to generate a negative feedback signal based on a refresh rate of the display module and send the negative feedback signal to the processor; the processor is further configured to generate an adjustment signal based on the frame rate and the refresh rate; and the display driver is further configured to adjust the refresh rate of the display module under a control of the adjustment signal to cause a refresh rate of the first image and the second image displayed by the display module to match the frame rate.

In some embodiments, the display driver is further configured to generate a third display driving signal based on a detection preparation instruction to control the display module to display a third image. The detection preparation instruction is sent before the heart rate detection instruction.

In some embodiments, the processor is further configured to generate and send the heart rate detection instruction.

In some embodiments, the processor is further configured to generate and send the detection preparation instruction.

In another aspect, a heart rate detection method in provided. The heart rate detection method includes: a touch controller sending a first control signal to a fingerprint recognition module in response to a heart rate detection instruction to control the fingerprint recognition module to collect blood flow information in blood vessels of a user; a processor obtaining the blood flow information and determining heart rate information of the user based on the blood flow information; the processor further generating a second control signal based on the heart rate information and sending the second control information to a display driver; and the display driver generating a first display driving signal based on the second control signal to control a display module to alternately display a first image and a second image. A switching frequency of the first image and the second image matching the heart rate information.

In some embodiments, the method further includes: the processor obtaining a heart rate parameter of the user within a set period based on the heart rate information of the user, generating a third control signal containing the heart rate parameter, and sending the third control signal to the display driver; the display driver generating a second display driving signal based on the third control signal to control the display module to display an image containing the heart rate parameter on the first image and/or the second image.

In some embodiments, the method further includes: the display driver generating a third display driving signal based on a detection preparation instruction to control the display module to display a third image. The detection preparation instruction is sent before the heart rate detection instruction.

In some embodiments, the fingerprint recognition module collecting the blood flow information in blood vessels of the user includes: the fingerprint recognition module collecting multiple images containing the blood flow information; the method further includes: after the processor determines the heart rate information, the touch controller obtaining a frame rate of the multiple images containing the blood flow information and sending the frame rate to the processor; the processor sending a vertical synchronization signal to the display driver, where the vertical synchronization signal is used to indicate the frame rate of the multiple images containing the blood flow information; the display driver generating a negative feedback signal based on a refresh rate of the display module and sending the negative feedback signal to the processor; the processor generating an adjustment signal based on the frame rate and the refresh rate; and the display driver adjusting the refresh rate of the display module under control of the adjustment signal to cause a refresh rate of the first image and the second image displayed by the display module to match the frame rate.

In some embodiments, the method further includes: the processor sending a vertical synchronization signal to the display driver, where the vertical synchronization signal is used to indicate the frame rate of the multiple images containing the blood flow information; the display driver adjusting the refresh rate of the display module based on the frame rate to cause a refresh rate of the first image and the second image displayed by the display module to match the frame rate; and the display driver further sending a negative feedback signal to the processor, where the negative feedback signal is used to indicate the refresh rate of the first image and the second image.

In another aspect, a computer-readable storage medium is provided. The computer-readable storage medium has computer program instructions stored thereon, and when executed on a computer (e.g., the electronic apparatus), the computer program instructions cause the computer to perform one or more steps in the heart rate detection method as described in any one of the above embodiments.

In another aspect, a computer program product is provided. The computer program product includes computer program instructions, and when executed on a computer (e.g., the electronic apparatus), the computer program instructions cause the computer to perform one or more steps in the heart rate detection method as described in any one of the above embodiments.

In another aspect, a computer program is provided. When executed on a computer (e.g., the electronic apparatus), the computer program causes the computer to perform one or more steps in the heart rate detection method as described in any one of the above embodiments.

BRIEF DESCRIPTION OF THE DRAWINGS

In order to describe the technical solutions in the present disclosure more clearly, the accompanying drawings to be used in some embodiments of the present disclosure will be briefly introduced below. Obviously, the accompanying drawings to be described below are merely drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DESCRIPTION OF THE INVENTION

Figure 1:
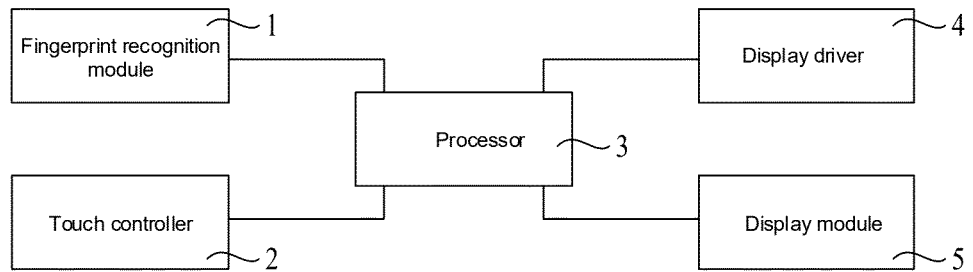
FIG. 1 is a block diagram of an electronic apparatus, in accordance with some embodiments.

The technical solutions in some embodiments of the present disclosure will be described clearly and completely in conjunction with the accompanying drawings. Obviously, the embodiments to be described are merely some but not all of embodiments of the present disclosure. All other embodiments obtained by a person of ordinary skill in the art based on the embodiments provided by the present disclosure shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "including, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, the terms such as "coupled" and "connected" and derivatives thereof may be used. The term "connected" should be understood in a broad sense. For example, the term "connected" may represent a fixed connection, or a detachable connection, or a one-piece connection; alternatively, the term "connected" may represent a direct connection, or an indirect connection through an intermediate medium. The term "coupled", for example, indicates that two or more components are in direct physical or electrical contact. The term "coupled" or "communicatively coupled" may also indicate that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

Additionally, the use of the phrase "based on" is meant to be open and inclusive, because a process, step, calculation or other action that is "based on" one or more of the stated conditions or values may, in practice, be based on additional conditions or values exceeding those stated.

It will be understood that, in a case where a layer or element is referred to be on another layer or substrate, it may be that the layer or element is directly on the another layer or substrate, or it may be that intervening layer(s) exist between the layer or element and the another layer or substrate.

Exemplary embodiments are described herein with reference to sectional views and/or plane views as idealized exemplary drawings. In the accompanying drawings, thicknesses of layers and sizes of regions are enlarged for clarity. Variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments Referring to FIGS. 1, 2 and 3, some embodiments of the present disclosure provide an electronic apparatus 10. The electronic apparatus 10 includes a display module 5.

For example, the electronic apparatus 10 includes, but is not limited to, a laptop computer, a tablet computer, a mobile phone, a personal digital assistant (PDA), a navigator, a wearable device (e.g., a portable computer watch), or any other product or component with a display function.

For example, the display module 5 may be any device that displays images whether in motion (e.g., videos) or stationary (e.g., static images), and whether textual or graphical.

In terms of the light-emitting type of the display module 5, the display module 5 may be an active light-emitting display module or a passive light-emitting display module. In a case where the display module 5 is a passive light-emitting display module, the display module 5 may include a liquid crystal display (LCD). In a case where the display module 5 is an active light-emitting display module, the display module 5 may be a quantum dot light-emitting diode (QLED) panel, an MLED (mini light-emitting diode or micro light-emitting diode) panel, an organic light-emitting diode (OLED) panel, or a plasma display panel (PDP), etc.

In terms of the form of the display module 5, the display module 5 may be a flat display module, a curved display module, or a foldable display module.

Figure 2:
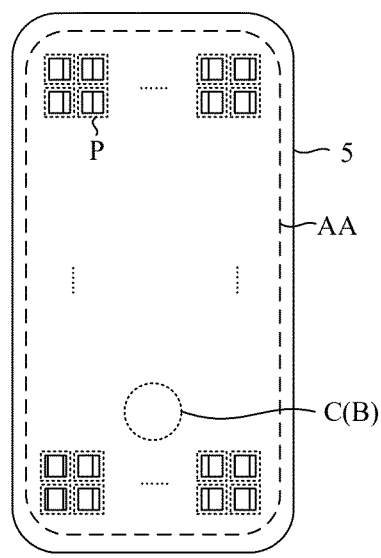
FIG. 2 is a plane structural diagram of an electronic apparatus, in accordance with some embodiments.
Figure 3:
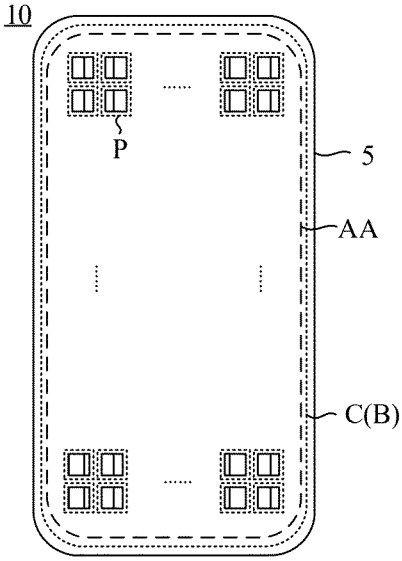
FIG. 3 is a plane structural diagram of an electronic apparatus, in accordance with some other embodiments.

In terms of the shape of the display module 5, the display module 5 may be in a shape of a rectangle or circle. As shown in FIGS. 2 and 3, in a case where the display module 5 is in a shape of a rectangle, corners of the display module 5 may be in an arc shape.

The above are merely examples of some possible implementations of the present disclosure and are not intended to be a limitation on the present disclosure. The implementations of the present disclosure are not limited to the above, and any other display types may also be taken into consideration as long as the same technical concept is applied.

In some embodiments, as shown in FIGS. 2 and 3, the display module 5 includes a plurality of pixels, and each pixel includes sub-pixels P of at least three colors.

In some examples, the sub-pixels P include at least a sub-pixel of a first color, a sub-pixel of a second color and a sub-pixel of a third color. The first color, the second color and the third color are three primary colors, such as red, green and blue.

In some other examples, the sub-pixels P further include a sub-pixel of a fourth color, and the fourth color is, for example, white.

In some embodiments, the display module 5 is an OLED display module, and each sub-pixel P includes at least one OLED light-emitting element. The OLED display module includes an OLED pixel driving circuit, and the OLED pixel driving circuit is configured to control one or a group of OLED light-emitting elements to emit light.

For example, a group of OLED light-emitting elements may include a row or a column of OLED light-emitting elements, or may include a plurality of adjacent OLED light-emitting elements.

For example, the OLED pixel driving circuit includes at least: a first light-emitting control module, a first voltage signal terminal, a second voltage signal terminal, a light-emitting control signal terminal and a data signal terminal. The first voltage signal terminal is coupled to anode(s) of the OLED light emitting element(s) and is configured to transmit a first voltage signal VDD to the anode(s) of the OLED light-emitting element(s). The second voltage signal terminal is coupled to cathode(s) of the OLED light-emitting element(s) and is configured to transmit a second voltage signal VSS to the cathode(s) of the OLED light-emitting element(s).

The first light-emitting control module is configured to: generate, under the control of a light-emitting control signal EM provided by the light-emitting control signal terminal, an OLED driving current due to the action of the first voltage signal VDD from the first voltage signal terminal, the second voltage signal VSS from the second voltage signal terminal and a data signal Data from the data signal terminal; and transmit the OLED driving current to the OLED light-emitting element(s). The OLED light-emitting element(s) are configured to emit light according to the OLED driving current in response that the light-emitting control signal EM provided by the light-emitting control signal terminal is at an operation level.

In some other embodiments, the display module 5 is an MLED display module, and each sub-pixel P includes at least one MLED light-emitting element. The MLED display module includes an MLED pixel driving circuit, and the MLED pixel driving circuit is configured to control one or a group of MLED light-emitting elements to emit light.

For example, a group of MLED light-emitting elements may include a row or a column of MLED light-emitting elements, or may include a plurality of adjacent MLED light-emitting elements.

For example, the MLED pixel driving circuit includes at least: a second light-emitting control module, a power supply terminal, a light-emitting control signal terminal and a data signal terminal. A positive electrode and a negative electrode of the power supply terminal are respectively coupled to first electrode(s) and second electrode(s) of the MLED light-emitting element(s). The power supply terminal is configured to provide a power supply voltage signal VCC to the MLED light-emitting element(s) to control the MLED light-emitting element(s) to be turned on.

The second light-emitting control module is configured to: generate, under the control of a light-emitting control signal OE provided by the light-emitting control signal terminal, an MLED driving current due to the action of the power supply voltage signal VCC of the power supply terminal and a data signal Data from the data signal terminal; and transmit the MLED driving current to the MLED light-emitting element(s). The MLED light-emitting element(s) are configured to emit light according to the MLED driving current in response that the light-emitting control signal OE provided by the light-emitting control signal terminal is at an operation level.

In some other embodiments, the display module 5 is an LCD display module, and the LCD display module includes a liquid crystal display panel and a backlight module. The liquid crystal display panel is disposed on a light-exit side of the backlight module. The liquid crystal display panel includes an array substrate and an opposite substrate that are arranged opposite to each other, and a liquid crystal layer disposed between the array substrate and the opposite substrate. A plurality of liquid crystal molecules are included in the liquid crystal layer.

In some examples, the array substrate includes pixel electrodes and switching transistors TFT connected to the pixel electrodes. A gate of a switching transistor TFT is coupled to a gate line, a first electrode of the switching transistor TFT is coupled to a data line, and a second electrode of the switching transistor TFT is coupled to a pixel electrode. The switching transistor TFT is configured to be turned on under the control of a gate signal Gate transmitted by the gate line and transmit a data signal Data from the data line to the pixel electrode.

A common electrode is provided on the array substrate or the opposite substrate. The common electrode is coupled to a common voltage terminal (e.g., a common electrode line), and the common voltage terminal is configured to provide a common voltage to the common electrode.

The liquid crystal molecules are configured to deflect under the control of an electric field formed due to the common voltage of the common electrode and a pixel voltage of the pixel electrode, so as to change the light transmittance of the liquid crystal molecules.

For example, the backlight module includes a plurality of light-emitting elements for providing the liquid crystal display panel with light required for displaying images. The plurality of light-emitting elements may be MLED light-emitting elements.

In some embodiments, as shown in FIG. 1, the electronic apparatus 10 further includes: a fingerprint recognition module 1, a touch controller 2, a processor 3 and a display driver 4.

Figure 4:
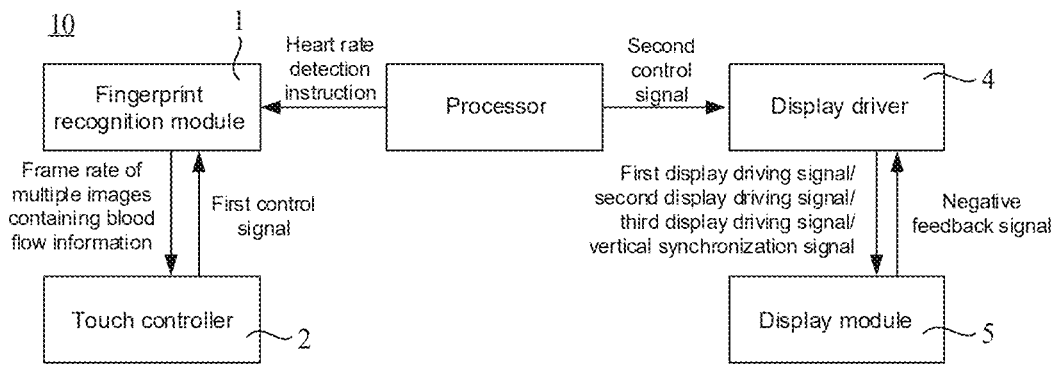
FIG. 4 is a block diagram showing signal transmission in the electronic apparatus, in accordance with some embodiments.

As shown in FIG. 4, the touch controller 2 is configured to send a first control signal to the fingerprint recognition module 1 in response to a heart rate detection instruction to control the fingerprint recognition module 1 to collect blood flow information in blood vessels of a user.

As shown in FIG. 4, the processor 3 is configured to obtain the blood flow information in the blood vessels of the user, and determine heart rate information of the user based on the blood flow information. The processor 3 is further configured to generate a second control signal based on the heart rate information of the user, and send the second control signal to the display driver 4.

As shown in FIG. 4, the display driver 4 is configured to generate a first display driving signal based on the second control signal and send the first display driving signal to the display module 5 to control the display module 5 to alternately display a first image TX1 and a second image TX2, a switching frequency of the first image TX1 and the second image TX2 matching the heart rate information.

For example, the heart rate detection instruction may be sent by the processor 3. For example, the processor 3 sends the heart rate detection instruction to the fingerprint recognition module 1 in the following two manners.

For example, the user triggers a function button on the electronic apparatus 10 to inform the electronic apparatus 10 to detect the heart rate of the user, and in this case, the processor 3 generates a heart rate detection instruction and sends the heart rate detection instruction.

The user triggering the function button on the electronic apparatus may mean that the electronic apparatus 10 is installed with an application for heart rate detection, and after entering the application, the user clicking a corresponding function button in the application is regarded as triggering the function button on the electronic apparatus 10. After the fingerprint recognition module 1 starts to collect the blood flow information in the blood vessels of the user, the display module 5 alternately displays the first image TX1 and the second image TX2 based on the heart rate information of the user.

For another example, in a case where a time duration that the user touches the fingerprint recognition module 1 reaches a first set time duration (e.g., 5 s), the processor 3 sends a heart rate detection instruction in response to the time duration that the user touches the fingerprint recognition module 1.

The electronic apparatus 10 provided in some embodiments of the present disclosure may detect the heart rate of the user through a cooperation of the fingerprint recognition module 1, the touch controller 2 and the processor 3, without providing an extra dedicated heart rate detection device. Furthermore, through the change of the display image (i.e., alternately displaying the first image TX1 and the second image TX2) of the display module 5, the electronic apparatus 10 enables the user to visually see the heartbeats corresponding to the heart rate information (for example, the first image TX1 and the second image TX2 being alternately displayed once corresponds to the heart beating once) during the heart rate detection process, and the switching frequency of the display image of the display module 5 is the same as the heartbeat frequency of the user, so that the display module 5 displays the changing rhythm of the heartbeat at a same frequency.

It can be understood that the heart rate information includes at least the number of heartbeats of the user in a unit time (e.g., one minute), and further includes a time duration of one heartbeat of the user in the unit time.

In comparison with displaying the heart rate test result through the display module 5 after completing the heart rate test, by adopting the electronic apparatus 10 provided by some embodiments of the present disclosure, the display image of the display module 5 may interact with the heart rate of the user in real time, allowing the user to obtain heart rate information in real time through changes of the display image of the display module 5 during the heart rate detection process, thereby optimizing the interaction effect between the electronic apparatus 10 and the user.

For example, as shown in FIGS. 2 and 3, a size of an active area AA of the display module 5 is less than or equal to a size of the display module 5. The active area AA is an area where the display module 5 can display images.

For example, as shown in FIGS. 2 and 3, the display module 5 is a touch display module.

In some examples, the fingerprint recognition module 1 is disposed in at least a portion of a region below the display module 5 (on a non-display side opposite to a display side); alternatively, the fingerprint recognition module 1 is disposed in at least a portion of a region inside the display module 5.

In some other examples, the fingerprint recognition module 1 is disposed on the back surface of the electronic apparatus 10.

In some other examples, the fingerprint recognition module 1 is disposed on a side surface of the electronic apparatus 10.

For example, the fingerprint recognition module 1 switches an operating state thereof in response to a control instruction (i.e., the control instruction may be sent by the processor 3 or the touch controller 2 to the fingerprint recognition module 1) from the processor 3 or the touch controller 2. The fingerprint recognition module 1 is configured to implement different functions in different operating states.

For example, the fingerprint recognition module 1 is used to collect fingerprint information of the user in a first operating state, and is used to collect blood flow information in the blood vessels of the user in a second operating state.

Several situations of the processor 3 sending a control instruction will be described by taking an example in which the processor 3 sends a control instruction to the fingerprint recognition module 1 below.

In some examples, the user triggers a function button on the electronic apparatus 10, and a control instruction is sent to the fingerprint recognition module 1. The user triggering the function button on the electronic apparatus 10 may mean that the electronic apparatus 10 is installed with an application for heart rate detection, and the user clicking an icon of the application to open the application is regarded as triggering the function button on the electronic apparatus 10, so that the fingerprint recognition module 1 switches the operating state thereof.

In some other examples, the user continuously touches the fingerprint recognition module 1, and a control instruction is sent to the fingerprint recognition module 1. The way in which the user continuously touches the fingerprint recognition module 1 includes at least the following two situations.

For example, in a case where a time duration that the user touches the fingerprint recognition module 1 reaches a first set time duration (e.g., 0.1 s), the processor 3 sends a first control instruction in response to the time duration that the user touches the fingerprint recognition module 1, and the fingerprint recognition module 1 switches to the first operating state. In a case where the fingerprint recognition module 1 is in the first operating state, the user touches an information collection region C, and the fingerprint recognition module 1 may collect fingerprint information in the information collection region C.

For another example, in a case where a time duration that the user touches the fingerprint recognition module 1 reaches a second set time duration (e.g., 5 s), the processor 3 sends a second control instruction in response to the time duration that the user touches the fingerprint recognition module 1, and the fingerprint recognition module 1 switches to the second operating state. In a case where the fingerprint recognition module 1 is in the second operating state, the user touches the information collection region C, and the fingerprint recognition module 1 may collect blood flow information in the blood vessels of the user.

The fingerprint recognition module 1 includes, for example, an optical fingerprint sensor. In a case where the fingerprint recognition module 1 is in the second operating state, the user touches the information collection region C with, for example, a finger (or a part of the body where blood vessels exist under the skin, such as the earlobe), and the fingerprint recognition module 1 collects multiple pieces of fingerprint information (e.g., multiple pieces of fingerprint image information) in the information collection region C.

As the heart beats, blood is pumped from the heart to every part of the body. During this process, due to the flow of blood, the light absorptivity and reflectivity of the body part (e.g., a finger) touching the fingerprint recognition module 1 changes. In this way, for a same fingerprint image information, the optical fingerprint sensor may collect different optical signals, so that the blood flow information in the blood vessels of the user may be obtained based on the changes of the optical signals corresponding to multiple pieces of fingerprint information.

Controlling the fingerprint recognition module 1 to collect the blood flow information in the blood vessels of the user may be collecting optical signals corresponding to multiple pieces of fingerprint image information.

In some other examples, the fingerprint recognition module 1 switches to a sleep state in response to a sleep instruction.

In a case where the fingerprint recognition module 1 is in the sleep state, touching the information collection region C will not trigger the fingerprint recognition module 1 to operate (e.g., to collect the fingerprint information of the user and/or the blood flow information in the blood vessels of the user).

The following description will be made by taking an example in which the fingerprint recognition module 1 is disposed below the display module 5 or disposed inside the display module 5.

In some examples, a size of the fingerprint recognition module 1 is less than the size of the active area AA of the display module 5.

For example, as shown in FIG. 2, the fingerprint recognition module 1 may be disposed in the active area AA of the display module 5. In this case, in a case where the fingerprint recognition module 1 is in the operating state, touching the information collection region C of the display module 5 may trigger the fingerprint recognition module 1 to collect the fingerprint information of the user and/or the blood flow information in the blood vessels of the user.

In some other examples, the size of the fingerprint recognition module 1 is greater than or equal to the size of the active area AA of the display module 5.

For example, as shown in FIG. 3, the active area AA may be located within an effective recognition region B of the fingerprint recognition module 1, and the effective recognition region B surrounds the information collection region C. In this case, by touching any portion of the information collection region C, the fingerprint recognition module 1 may perform operations, for example, collect the fingerprint information of the user and/or collect the blood flow information in the blood vessels of the user.

For example, as shown in FIGS. 2 and 3, the display module 5 has an information collection region C corresponding to the effective recognition region B of the fingerprint recognition module 1. The effective recognition region B is a portion of the fingerprint recognition module 1 that may effectively collect the fingerprint information of the user and/or the blood flow information in the blood vessels of the user. The size of the fingerprint recognition module 1 is greater than or equal to a size of the effective recognition region B of the fingerprint recognition module 1.

In some examples, the size of the effective recognition region B is the same or substantially the same as the size of the information collection region C.

It will be noted that the size of the effective recognition region B may be greater than the size of the information collection region C, so as to ensure that when touching the information collection region C, the fingerprint recognition module 1 may completely and effectively obtain the fingerprint information in the information collection region C. In a case where the fingerprint recognition module 1 is in an operating state (e.g., the first operating state or the second operating state), touching a portion (e.g., the information collection region C) of the display module 5 corresponding to the fingerprint recognition module 1 may trigger the fingerprint recognition module 1 to collect the fingerprint information of the user or the blood flow information in the blood vessels of the user.

The specific technical solution of the first display driving signal controlling the display module 5 to alternately display the first image and the second image will be described below.

Figure 5:
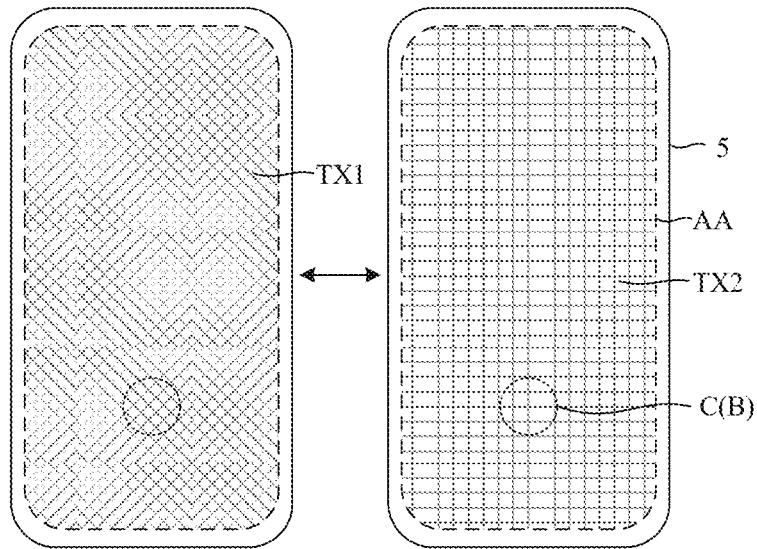
FIG. 5 shows a first image and a second image that are alternately displayed by a display module, in accordance with some embodiments.
Figure 6:
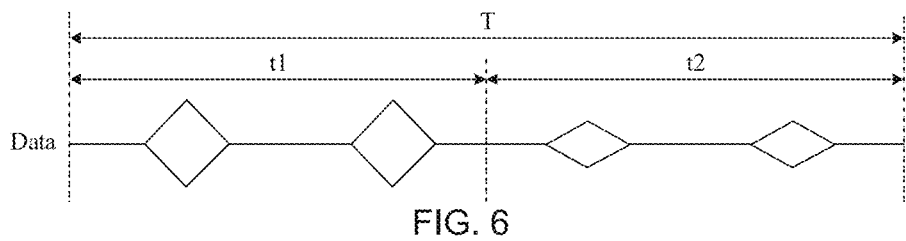
FIG. 6 is a timing diagram of a data signal, in accordance with some embodiments.

In some embodiments, as shown in FIGS. 5 and 6, the first display driving signal sent by the display driver 4 to the display module 5 includes a plurality of display periods T, each display period T includes a display time t1 of a first image TX1 and a display time t2 of a second image TX2. In a display period T, the first image TX1 and the second image TX2 display different contents.

For example, during the process of the electronic apparatus 10 detecting the heart rate of the user, the display driver 4 is configured to generate a first display driving signal to control the display module 5 to alternately display the first image TX1 and the second image TX2 at a switching frequency matching the heart rate information.

Each display period T corresponds to, for example, the time of one heartbeat of the user. The time of one heartbeat of the user is, for example, 0.8 s or 1 s, and correspondingly, the time duration of the display period T is 0.8 s or 1 s. In this way, within each display period T, the display module 5 alternately displays a first image TX1 and a second image TX2. By observing the changes in the display image of the display module 5, the user may visually see the changes of heart rate during the heart rate detection process. For example, the faster the heart beats, the higher the switching frequency between the first image TX1 and the second image TX2.

In comparison with displaying the heart rate test result through the display module 5 after completing the heart rate detection, by adopting the above solution, the interaction effect between the electronic apparatus 10 and the user may be optimized.

For example, the first image TX1 includes x frames of images, and the second image TX2 includes y frames of images, where x≥1 and y≥1. The display images of the x frames of images included in the first image TX1 are the same, the display images of the y frames of images included in the second image TX2 are the same, and the display images of the first image TX1 and the second image TX2 are different.

As shown in FIG. 6, by changing the respective data signals Data corresponding to the display images of the display module 5, the data signals Data corresponding to the first image TX1 are made different from the data signals Data corresponding to the second image TX2, so that the display image of the display module 5 may alternately change the display content as the heart rate of the user changes. During the process of detecting the heart rate of the user, the user may obtain the heart rate information in real time by observing the switching frequency of the display image of the display module 5.

In comparison with displaying the heart rate test result through the display module 5 after completing the heart rate test, by adopting the electronic apparatus 10 provided by some embodiments of the present disclosure, the heart rate information can be obtained in real time through the changes in the display image of the display module 5 during the heart rate detection process, thereby optimizing the interaction effect between the electronic apparatus 10 and the user.

For example, the higher the switching frequency of the content of the display image of the display module 5 (i.e., the higher the switching frequency of the first image TX1 and the second image TX2), the faster the heart beats of the user, and during the heart rate detection process, the user may visually see the changes in the heart rate.

The content displayed by the first image TX1 and/or the second image TX2 may be customized according to user's needs. Here, it is an exemplary description and is not intended to limit the present disclosure.

The above technical solution may be applied to an electronic apparatus 10 having an active light-emitting display module or a passive light-emitting display module.

Figure 7:
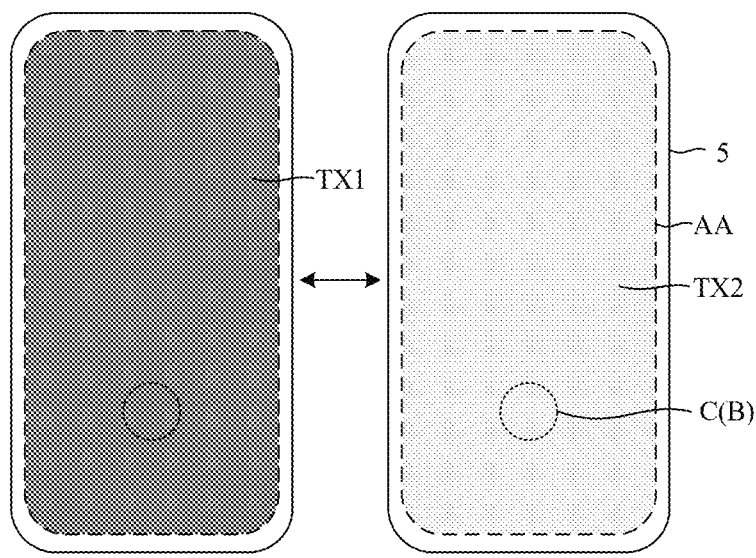
FIG. 7 shows a first image and a second image that are alternately displayed by a display module, in accordance with some other embodiments.

In some embodiments, as shown in FIGS. 6 and 7, the first display driving signal sent by the display driver 4 to the display module 5 includes a plurality of display periods T, and each display period T includes a display time t1 of a first image TX1 and a display time t2 of a second image TX2. In a display period T, a display luminance of the first image TX1 is different from a display luminance of the second image TX2.

For example, a second display luminance in which the display module 5 displays the second image TX2 may be 1.5 times, 2 times or 2.5 times a first display luminance in which the display module 5 displays the first image TX1. The above change in luminance is only for exemplary description and is not specifically limited, as long as the change in luminance of the image can be significantly distinguished and the user can obtain the change in the heart rate by observing the display image of the display module 5.

In some examples, as shown in FIG. 7, the display images of the first image TX1 and the second image TX2 are the same but have different display luminances.

In some other examples, the display images of the first image TX1 and the second image TX2 are different and have different luminances.

That is, within a display period T, on a premise that the display luminances of the alternately displayed first image TX1 and second image TX2 are different, the first image TX1 and the second image TX2 may display a same image or different images.

The above technical solution may be applied to an electronic apparatus 10 having an active light-emitting display module or a passive light-emitting display module.

In case of being applied to an electronic apparatus 10 having an OLED display module, the OLED driving current may be changed by changing at least one of the following three objects: a duty ratio of a light-emitting control signal EM corresponding to the first image TX1 and the second image TX2, a value of a first voltage signal VDD corresponding to the first image TX1 and the second image TX2, and a value of a data signal Data corresponding to the first image TX1 and the second image TX2. In this way, the luminance of the OLED light-emitting element may be changed.

In case of being applied to an electronic apparatus 10 having an MLED display module, the MLED driving current may be changed by changing at least one of the following three objects: a duty ratio of a light-emitting control signal OE corresponding to the first image TX1 and the second image TX2, a value of a power supply voltage signal VCC corresponding to the first image TX1 and the second image TX2, and a value of a data signal Data corresponding to the first image TX1 and the second image TX2. In this way, the luminance of the MLED light-emitting element may be changed.

In case of being applied to an electronic apparatus 10 having an LCD display module, a data signal Data corresponding to the first image TX1 and the second image TX2 may be changed to change the voltage applied to a pixel electrode, so that the deflection angle of the liquid crystal molecules corresponding to the pixel electrode P is changed, and in turn, the light transmittance of these liquid crystal molecules is changed. As a result, the display luminance of the display module is changed.

Figure 8:
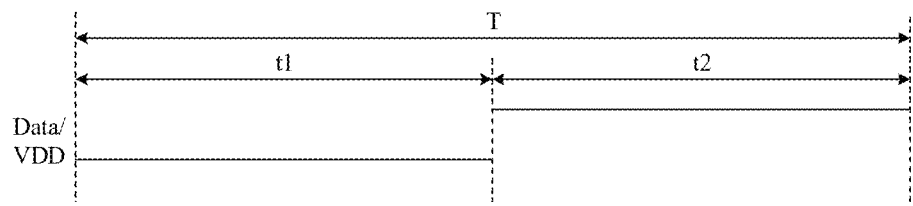
FIG. 8 is a timing diagram of a data signal or a first voltage signal, in accordance with some embodiments.

The above-mentioned various types of display modules are expected to realize the alternating change of the first image TX1 and the second image TX2 through one or more of the following embodiments. FIGS. 6 and 8 show the values of the data voltage of the image that is displayed by the display module 5 based on the data signal Data in the first display driving signal.

In some embodiments, the display module 5 may be an active light-emitting display module or a passive light-emitting display module. As shown in FIG. 8, the first display driving signal includes data signals Data, and a ratio of each data signal Data corresponding to the first image TX1 to a respective data signal Data corresponding to the second image TX2 is the same, and the ratio is not equal to 1.

For example, the first image TX1 includes x frames of images, the second image TX2 includes y frames of images, and the display images of the x frames of images included in the first image TX1 and the y frames of images included in the second image TX2 are the same.

In some examples, the data signals Data corresponding to the x frames of images included in the first image TX1 are the same, and the data signals Data corresponding to the y frames of images included in the second image TX2 are the same.

By adjusting the data signals Data corresponding to the display images (the first image TX1 and the second image TX2) of the display module 5 by a same proportion, display grayscales corresponding to the sub-pixels P of the display module 5 are changed by a same proportion. In this way, the image displayed by the display module 5 based on the data signals Data corresponding to the first image TX1 and the image displayed by the display module 5 based on the data signals Data corresponding to the second image TX2 each have a same display image and a different display luminance, so that the display image of the display module 5 changes alternately between bright and dark with the heart rate of the user. As a result, during the heart rate detection process, the user may visually see the heart rate information (e.g., the time of one heartbeat) by observing the display images of the display module 5.

For example, the first image TX1 and the second image TX2 display a same display image; when the display module 5 displays the first image TX1 and the second image TX2, the display content corresponding to sub-pixels P remains unchanged, but the display grayscale changes.

The change in the display luminance of the first image TX1 and the second image TX2 may mean that the display luminance of the second image TX2 increases by 30%, 50% or 100% compared to the first image TX1, or that the display luminance of the second image TX2 decreases by 10%, 50% or 80% compared to the first image TX1. Here, it is an exemplary description and is not intended to limit the present disclosure.

In some embodiments, as shown in FIG. 8, a data voltage value corresponding to each data signal Data corresponding to the first image TX1 is different from a data voltage value corresponding to each data signal Data corresponding to the second image TX2.

In the first image TX1 and the second image TX2, the one having a greater data voltage value corresponding to each data signal Data has a greater display luminance. Referring to FIG. 8, the data voltage value corresponding to each data signal Data corresponding to the second image TX2 is greater than the data voltage value corresponding to the data signals Data corresponding to the first image TX1. Therefore, the display luminance of the second image TX2 is greater than that of the first image TX1. In this way, by alternating displaying the first image TX1 and the second image TX2, the user may visually obtain the real-time heart rate information through the change in bright and dark of the display images of the display module 5.

In some embodiments, the display module 5 may be an OLED display module. As shown in FIG. 8, the first display driving signal includes first voltage signals VDD, and a ratio of each first voltage signal VDD corresponding to the first image TX1 to a respective first voltage signal VDD corresponding to the second image TX2 is the same, and the ratio is not equal to 1.

In a case where the first voltage signal VDD transmitted to an anode of an OLED light-emitting element changes, the voltage value transmitted to the anode of the OLED light-emitting element changes, and the voltage difference between the anode and the cathode of the OLED light-emitting element changes, so that the luminance of the OLED light-emitting element is changed.

By adjusting the first voltage signals VDD corresponding to the display images (the first image TX1 and the second image TX2) of the display module 5 by a same proportion, the luminances of the OLED light-emitting elements displaying the first image TX1 and the second image TX2 are changed by a same proportion, so that the display image of the display module 5 alternately changes between bright and dark with the heart rate of the user. As a result, during the heart rate detection process, the user may visually see the heart rate parameter (e.g., the time of one heartbeat) by observing the display images of the display module 5.

In some examples, the data signals Data corresponding to the display images (the first image TX1 and the second image TX2) of the display module 5 may be adjusted while adjusting the first voltage signals VDD corresponding to the display images (the first image TX1 and the second image TX2) of the display module 5 by a same proportion, so that the display contents of the first image TX1 and the second image TX2 are different. In this way, the display contents and display luminances of the first image TX1 and the second image TX2 both change, so that the user may obtain the real-time heart rate parameter through changes in display image and luminance.

Figure 9:
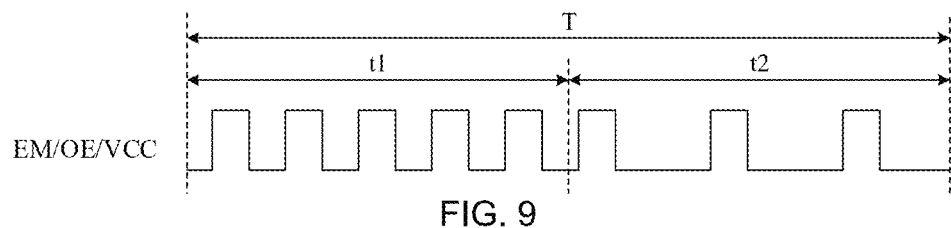
FIG. 9 is a timing diagram of a light-emitting control signal or a power supply voltage signal, in accordance with some embodiments.
Figure 10:
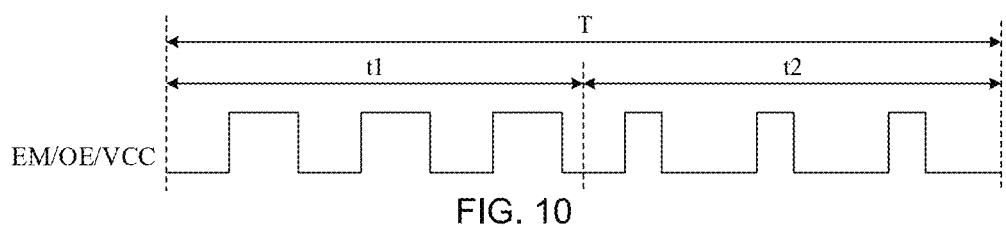
FIG. 10 is a timing diagram of a light-emitting control signal or a power supply voltage signal, in accordance with some other embodiments.

In some embodiments, the display module 5 may be an OLED display module or an MLED display module. As shown in FIGS. 9 and 10, the first display driving signal includes light-emitting control signals EM/OE, and a ratio of a duty ratio of each light-emitting control signal EM/OE corresponding to the first image TX1 to a duty ratio of a respective light-emitting control signal EM/OE corresponding to the second image TX2 is the same, and the ratio is not equal to 1.

For example, as shown in FIGS. 9 and 10, within a display time t1 of the first image TX1, the duty ratio of the light-emitting control signal EM/OE is B1; within a display time t2 of the second image TX2, the duty ratio of the light-emitting control signal EM/OE is B2, and B1/B2≠1. In this way, a proportion of a luminous duration of the display module 5 within the display time t1 of the first image TX1 to the display time t1 is not equal to a proportion of a luminous duration of the display module 5 within the display time t2 of the second image TX2 to the display time t2, so that the user can observe, while watching the display module 5, observe the change in luminance when displaying the first image TX1 and the second image TX2. As a result, during the heart rate detection process, the user may visually see the heart rate information (e.g., the time of one heartbeat) by observing the display images of the display module 5.

In some examples, the data signals Data corresponding to the display images of the display module 5 may be adjusted while adjusting the light-emitting control signals EM/OE corresponding to the display images (the first image TX1 and the second image TX2) of the display module 5 by a same proportion, so that the display contents of the first image TX1 and the second image TX2 are different. In this way, the display contents and display luminances of the first image TX1 and the second image TX2 both change, so that the user can obtain the real-time heart rate information through changes in display image and luminance.

For example, the first image TX1 includes x frames of images, and the second image TX2 includes y frames of images. In the x frames of images included in the first image TX1, the number of operation levels of the light-emitting control signal EM/OE corresponding to each frame of image is a1, and a duration of the operation level of each light-emitting control signal EM/OE is a2; in the y frames of images included in the second image TX2, the number of operation levels of the light-emitting control signal EM/OE corresponding to each frame of image is b1, and a duration of the operation level of each light-emitting control signal EM/OE is b2.

On this basis, by changing a duration of an effective level of the light-emitting control signal EM/OE corresponding to each frame of image, the display luminance of the image of the display module 5 may be changed, and the duration of the effective level of the light-emitting control signal EM/OE may be changed, for example, in the following two ways.

In some examples, the number of operation levels of each light-emitting control signal EM/OE corresponding to the first image TX1 is different from the number of operation levels of each light-emitting control signal EM/OE corresponding to the second image TX2.

As shown in FIG. 9, a1≠b1, a2=b2. For example, the display time t1 is equal to the display time t2. The number of operation levels of the light-emitting control signal EM/OE within the display time t1 is different from the number of operation levels of the light-emitting control signal EM/OE within the display time t2. The duration of the operation level of each light-emitting control signal EM/OE within the display time t1 is equal to the duration of the operation level of each light-emitting control signal EM/OE within the display time t2. In this way, within different display times (the display time t1 and display time t2), a total luminous duration of the display module 5 is different, so that the display luminance of the display image of the display module 5 within the display time t1 is different from that of the display module 5 within the display time t2.

In some other examples, the duration of the operation level of each light-emitting control signal EM/OE corresponding to the first image TX1 is different from the duration of the operation level of each light-emitting control signal EM/OE corresponding to the second image TX2.

As shown in FIG. 10, a1=b1, a2≠b2. For example, the display time t1 is equal to the display time t2. The number of the operation levels of the light-emitting control signal EM/OE within the display time t1 is equal to the number of the operation levels of the light-emitting control signal EM/OE within the display time t2. The duration of the operation level of each light-emitting control signal EM/OE within the display time t1 is different from the duration of the operation level of each light-emitting control signal EM/OE within the display time t2. In this way, within different display times (the display time t1 and display time t2), a total luminous duration of the display module 5 is different, so that the display luminance of the display image of the display module 5 within the display time t1 is different from that of the display module 5 within the display time t2.

It will be noted that, for the duration of operation level of each light-emitting control signal EM/OE corresponding to the first image TX1 and the second image TX2 and the number of operation levels of each light-emitting control signal EM/OE corresponding to the first image TX1 and the second image TX2, at least one of the two changes, and correspondingly, the display luminances of the first image TX1 and the second image TX2 are different.

It will be understood that, in order to achieve a display effect that display luminances of the first image TX1 and the second image TX2 are different, the duration of the operation level and the number of operation levels of each light-emitting control signal EM/OE corresponding to the first image TX1 and the second image TX2 may be both changed, and the specific design may be made adaptively according to actual needs.

In some embodiments, the display module 5 may be an MLED display module. As shown in FIGS. 9 and 10, the first display driving signal includes power supply voltage signals VCC, and a ratio of a duty ratio of each power supply voltage signal VCC corresponding to the first image TX1 to a duty ratio of a respective power supply voltage signal VCC corresponding to the second image TX2 is the same, and the ratio is not equal to 1.

For example, as shown in FIGS. 9 and 10, within the display time t1 of the first image TX1, the duty ratio of the power supply voltage signal VCC is C1; within the display time t2 of the second image TX2, the duty ratio of the power supply voltage signal VCC is C2, and C1/C2≠1.

In a case where a power supply voltage provided by the power supply voltage signal VCC that is applied to an MLED light-emitting element is less than a turn-on voltage of the MLED light-emitting element (i.e., the power supply voltage signal VCC is at a non-operation level), the MLED light-emitting element is turned off. In a case where the power supply voltage provided by the power supply voltage signal VCC that is applied to the MLED light-emitting element is greater than or equal to the turn-on voltage of the MLED light-emitting element (i.e., the power supply voltage signal VCC is at an operation level), the MLED light-emitting element is turned on and emits light.

In each display frame, the higher the proportion of the time duration of the power supply voltage signal VCC being at the operation level, the longer the MLED light-emitting element emits light in the display frame, and correspondingly, the greater the display luminance the display image. By changing the duty ratio of each power supply voltage signal VCC corresponding to the display images (the first image TX1 and the second image TX2) of the display module 5, a proportion of a luminous duration of the display module 5 within the display time t1 of the first image TX1 to the display time t1 is different from a proportion of a luminous duration of the display module 5 within the display time t2 of the second image TX2 to the display time t2, so that the user can observe, while watching the display module 5, the change in luminance when displaying the first image TX1 and the second image TX2. As a result, during the heart rate detection process, the user may visually see the heart rate information (e.g., the time of one heartbeat) by observing the display images of the display module 5.

In some examples, in a case where the display module 5 alternately displays the first image TX1 and the second image TX2, the display contents and display luminances of the first image TX1 and the second image TX2 both change, so that the user can obtain the real-time heart rate information through changes in the display image and luminance.

For example, the first image TX1 includes x frames of images, and the second image TX2 includes y frames of images. In the x frames of images included in the first image TX1, the number of operation levels of the power supply voltage signal VCC corresponding to each frame of image is c1, and a duration of the operation level of each power supply voltage signal VCC is c2; in the y frames of images included in the second image TX2, the number of operation levels of the power supply voltage signal VCC corresponding to each frame of image is d1, and a duration of the operation level of each power supply voltage signal VCC is d2.

Figure 11:
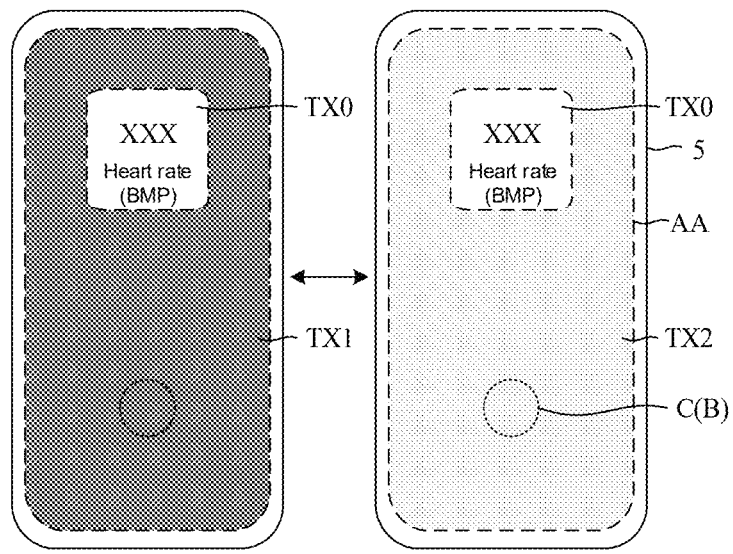
FIG. 11 shows an image containing a heart rate parameter and displayed by a display module, in accordance with some embodiments.
Figure 12:
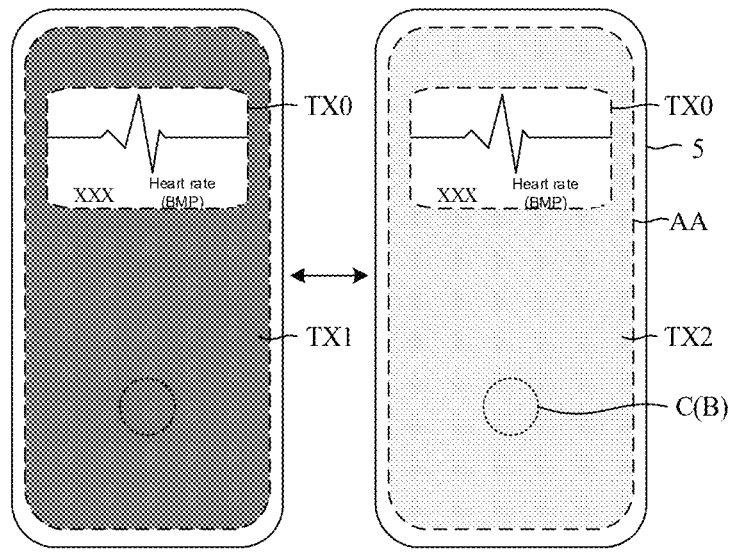
FIG. 12 shows another image containing a heart rate parameter and displayed by a display module, in accordance with some embodiments.

In some embodiments, as shown in FIGS. 11 and 12, the processor 3 is further configured to: obtain the heart rate parameter of the user within a set period based on the heart rate information; generate a second control signal containing the heart rate parameter; and send the second control signal to the display driver 4. The display driver 4 is further configured to generate a second display driving signal based on the second control signal to control the display module 5 to display an image TX0 including the heart rate parameter on the first image TX1 and/or the second image TX2.

For example, the image TX0 including the heart rate parameter may be displayed on the first image TX1, or displayed on the second image TX2, or displayed on both the first image TX1 and the second image TX2.

For example, the heart rate parameter includes times of the heart beats per unit time (e.g., one minute). The entire heart rate detection process includes a plurality of set periods, and each set period includes, for example, at least one display period T.

When performing the heart rate detection, it is possible to obtain the heart rate of the user by detecting the number of heartbeats in one minute; it is also possible to deduce the number of heartbeats in one minute by detecting a duration of each heartbeat to obtain the real-time heart rate of the user. During the heart rate detection process, each set period corresponds to, for example, the time of one heartbeat, and it is possible to deduce the current real-time heart rate based on a duration of the current set period. The heart rate parameter includes the current real-time heart rate deduced based on the time of one heartbeat.

For example, a duration of a first set period is 1 s, and the corresponding real-time heart rate of the current user is 60 beats/minute; a duration of a second set period is 0.8 s, and the corresponding real-time heart rate of the current user is 75 beats/minute. The processor 3 may obtain the heart rate parameter of the user within a set period based on the heart rate information, and the display module 5 displays an image TX0 containing the real-time heart rate parameter under the control of the second display driving signal. In this way, during the heart rate detection process, the user may not only obtain the heart rate information through the switching frequency of the first image TX1 and the second image TX2 that are displayed by the display module 5, but also obtain the real-time heart rate parameter through the image TX0 containing the heart rate parameter and displayed by the display module 5.

In some examples, as shown in FIG. 11, the image TX0 containing real-time heart rate information may display numerical text corresponding to the real-time heart rate information.

In some other examples, as shown in FIG. 12, the image TX0 containing real-time heart rate information may display not only the numerical text corresponding to the real-time heart rate information, but also an electrocardiogram or a heart rate waveform corresponding to the real-time heart rate information.

In some embodiments, as shown in FIGS. 11 and 12, an area of the image TX0 containing the heart rate parameter is less than an area of the first image TX1 and/or an area of the second image TX2.

For example, in a case where the image TX0 containing the heart rate parameter is displayed on the first image TX1, the area of the image TX0 containing the heart rate parameter is less than the area of the first image TX1. In a case where the image TX0 containing the heart rate parameter is displayed on the second image TX2, the area of the image TX0 containing the heart rate parameter is less than the area of the second image TX2. In a case where the image TX0 containing the heart rate parameter is displayed on both the first image TX1 and the second image TX2, the area of the image TX0 containing the heart rate parameter is less than the area of the first image TX1 and less than the area of the second image TX2.

By making the area of the image TX0 containing the heart rate parameter less than the area of the first image TX1 and/or the second image TX2, during the heart rate detection process, the alternatingly displayed first image TX1 and second image TX2 will not be completely blocked by the image TX0 containing the heart rate parameter. In this way, when the user watches the display module 5, even with the presence of the image TX0 containing the heart rate parameter, the alternating changes of the first image TX1 and the second image TX2 may still be observed.

In this way, when watching the display module 5, the user may obtain the real-time heart rate information not only through the changing frequency of the first image TX1 and the second image TX2, but also through the image TX0 containing the heart rate parameter. Thus, the interaction effect between the electronic apparatus 10 and the user is optimized.

In some embodiments, as shown in FIGS. 11 and 12, within a display period T, the display luminance of the image TX0 containing the heart rate parameter remains unchanged.

During the heart rate detection process, the first image TX1 and the second image TX2 are alternately displayed, and the display images and/or display luminances of the first image TX1 and the second image TX2 are different, while the display luminance of the image TX0 containing the heart rate parameter and displayed on the first image TX1 and/or the second image TX2 remains unchanged. Thus, it is beneficial for the user to obtain real-time heart rate information during the heart rate detection process by observing the image TX0 containing the heart rate parameter and displayed by the display module 5.

It will be noted that, during the heart rate detection process, the change in the display image (the change in display content and/or display luminance) of the display module 5 may be implemented according to at least one of the above embodiments.

For example, within a display period T, the display luminance of the image TX0 containing the heart rate parameter may also change with the alternation of the first image TX1 and the second image TX2.

In some embodiments, the fingerprint recognition module 1 is an optical fingerprint recognition module.

For example, a press-type optical fingerprint recognition module includes an optical fingerprint sensor.

In some examples, the user places a finger on the fingerprint recognition module 1, and the optical fingerprint sensor may obtain the fingerprint information of the user based on changes of the light absorptivity and reflectivity of various parts of the finger of the user.

In the process of obtaining the fingerprint information of the user, the fingerprint recognition module 1 dynamically detects valid fingerprint image information at a set frame rate. For example, the fingerprint recognition module 1 recognizes 60 frames of fingerprint images per second.

During the entire heart rate detection process, the operating state of the fingerprint recognition module 1 is switched to the second operating state to obtain blood flow information in the blood vessels of the user; the processor 3 sends a second control signal to the display driver 4 based on the blood flow information; the display driver 4 generates a first display driving signal based on the second control signal to control the display module 5 to alternately switch the first image TX1 and the second image TX2 at a frequency matching the heart rate information of the user.

In this process, if a refresh rate of the display image of the display module 5 is inconsistent with the frame rate of the fingerprint recognition module 1, it may be possible to cause "tearing" occurring on the display image of the display module 5.

For example, the processor 3 obtains the blood flow information in the blood vessels of the user that is obtained by the fingerprint recognition module 1; the blood flow information includes multiple fingerprint images collected by the fingerprint recognition module 1, and the frame rate of each fingerprint image is 60 frames/second. The display driver 4 generates the first display driving signal based on the second control signal from the processor 3, and the display module 5 displays images (alternatingly displays the first image TX1 and the second image TX2) based on the first display driving signal.

The first display driving signal includes a data signal Data. The display module 5 receives and processes the data signal Data to display an image corresponding to the data signal Data. In a case where a speed at which the display driver 4 generates a data signal Data corresponding to a frame of display image is inconsistent with a speed at which the display module 5 processes a data signal Data corresponding to a frame of display image for image display, the image displayed by the display module 5 may have a "tearing" problem in the display image.

Figure 13:
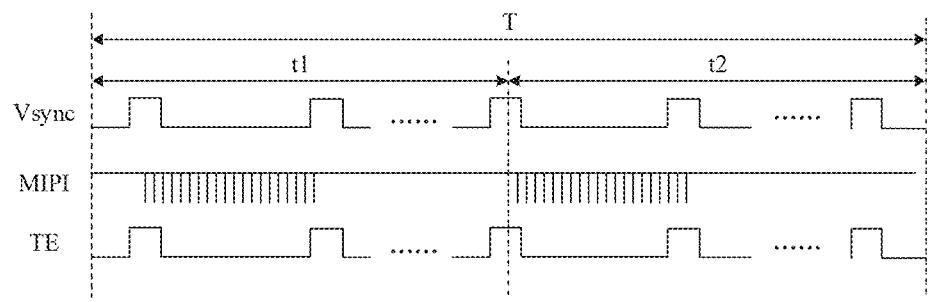
FIG. 13 is a timing diagram of a vertical synchronization signal and a negative feedback signal, in accordance with some embodiments.

Based on this, in some embodiments of the present disclosure, as shown in FIGS. 4 and 13, the fingerprint recognition module 1 collecting blood flow information in the blood vessels of the user includes: collecting multiple images containing blood flow information. After the processor 3 determines the heart rate information, the touch controller 2 is further configured to obtain a frame rate of the multiple images containing the blood flow information and send the frame rate to the processor 3; the processor 3 is further configured to send a vertical synchronization signal Vsync to the display driver 4, and the vertical synchronization signal Vsync is used to indicate the frame rate of the multiple images containing the blood flow information; the display driver 4 is further configured to generate a negative feedback signal TE based on a refresh rate of the display module 5 and send the negative feedback signal TE to the processor 3.

The processor 3 is further configured to generate an adjustment signal based on the frame rate and the refresh rate; the display driver 4 is further configured to adjust the refresh rate of the display module 5 under the control of the adjustment signal to make a refresh rate of the first image TX1 and the second image TX2 that are displayed by the display module 5 match the frame rate.

As shown in FIGS. 4 and 13, the second control signal sent by the processor 3 to the display driver 4 includes an image transmission signal MIPI, and the image transmission signal MIPI includes image information containing blood flow information. The processor 3 sends multiple images containing blood flow information to the display driver 4 frame-by-frame through, for example, the image transmission signal MIPI, the display driver 4 sends data signals Data corresponding to the multiple images containing blood flow information to the display module 5, and the display module 5 generates display images (the first image TX1 and/or second image TX2, and a third image) frame-by-frame based on the data signals Data.

By adjusting the refresh rate of the display module 5 by the processor 3, the speed of the display module 5 processing each frame of image is made consistent with the speed of the processor 3 sending each frame of image containing blood flow information to the display driver 4. In this way, while the quality of the display image of the display module 5 may be ensured, it is also ensured that the change in display image (the switching frequency of the first image TX1 and the second image TX2) of the display module 5 is synchronize with the heart rate parameter of the user.

Figure 14:
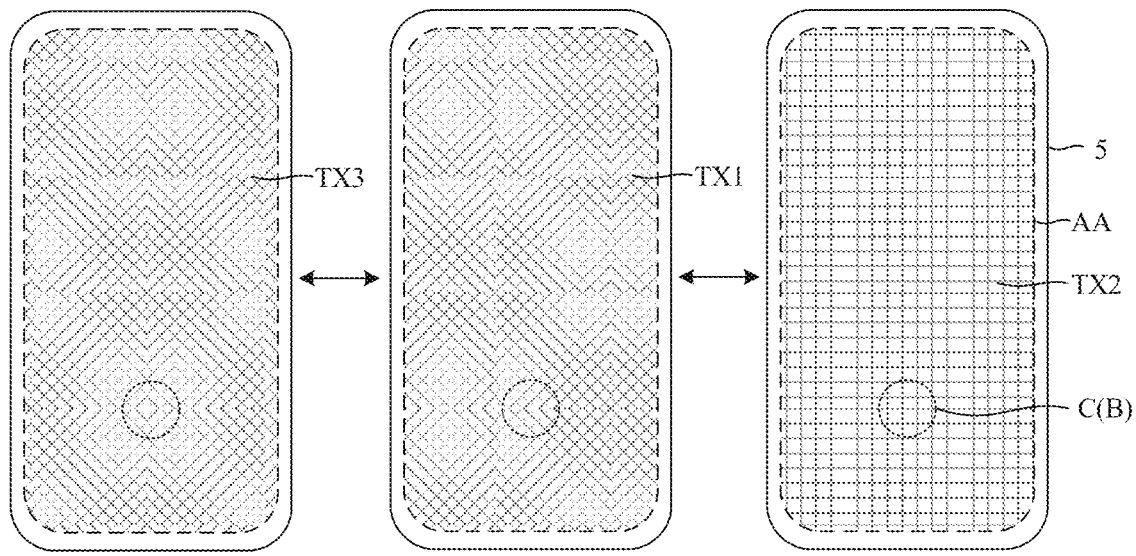
FIG. 14 is a diagram showing a comparison of a third image with a first image and a second image that are displayed by a display module, in accordance with some embodiments.
Figure 15:
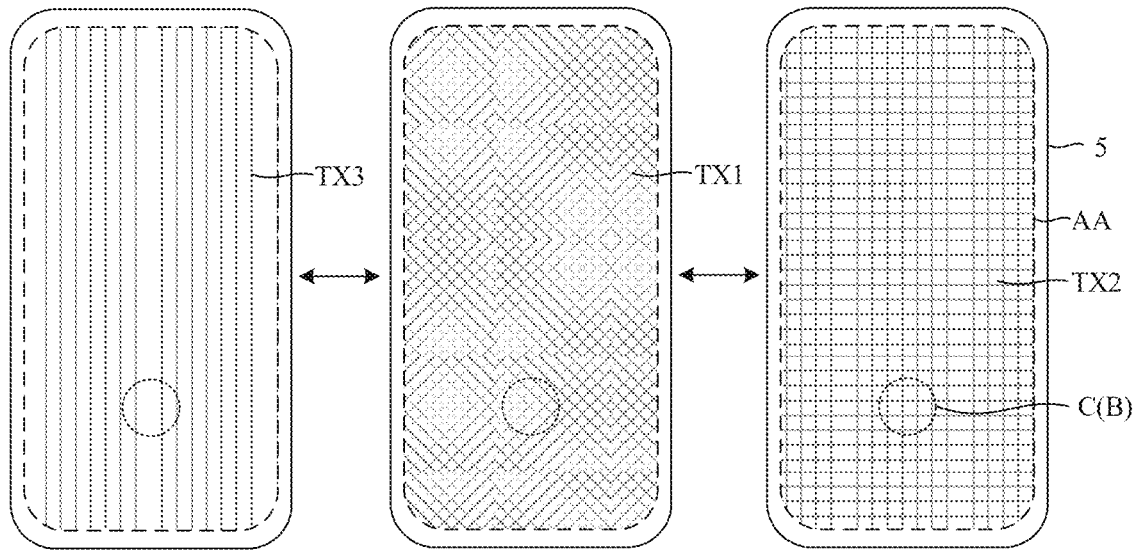
FIG. 15 is a diagram showing a comparison of a third image with a first image and a second image that are displayed by a display module, in accordance with some other embodiments.

In some embodiments, as shown in FIG. 4 and FIGS. 14 and 15, the display driver 4 is further configured to generate a third display driving signal based on a detection prepara-tion instruction, and send the third display driving signal to the display module 5 to control the display module 5 to display a third image TX3. The detection preparation instruction is generated before the heart rate detection instruction.

For example, based on the foregoing, in a case where the contents displayed by the first image TX1 and the second image TX2 are the same, the third image TX3 may have a same content as the displayed content of either the first image TX1 or the second image TX2; alternatively, the content displayed by the third image TX3 is different from that of both the first image TX1 and the second image TX2.

In a case where the display luminances of the contents displayed by the first image TX1 and the second image TX2 are different, the third image TX3 may have a same display luminance as the display luminance of either the first image TX1 or the second image TX2; alternatively, the display luminance of the content displayed by the third image TX3 is different from that of both the first image TX1 and the second image TX2.

For example, the user triggers a function button on the electronic apparatus 10 to inform the electronic apparatus 10 to prepare for a heart rate detection, and in this case, the processor 3 generates a detection preparation instruction and sends the detection preparation instruction. The user triggering the function button on the electronic apparatus may mean that the electronic apparatus 10 is installed with an application for heart rate detection, and the user clicking the icon of the application to open the application is regarded as triggering the function button on the electronic apparatus 10. The display module 5 displays the third image TX3, and after the fingerprint recognition module 1 starts to collect blood flow information in the blood vessels of the user, the display module 5 alternately displays the first image TX1 and the second image TX2 based on the heart rate information of the user.

When the display module 5 displays the third image TX3, the fingerprint recognition module 1 is in a detection preparation state, and starts to collect blood flow information in the blood vessels of the user after receiving a heart rate detection instruction for performing heart rate detection.

It will be understood that when the fingerprint recognition module 1 starts to collect blood flow information in the blood vessels of the user in response to the heart rate detection instruction, if the user does not timely place a finger (or a part of the body where blood vessels exist under the skin, such as the earlobe) on the fingerprint recognition module 1 at the start time, then the heart rate information of the user generated by the processor 3 is inaccurate, and the actual heart rate information is not obtained during a period from the fingerprint recognition module 1 starting to collect information to the user placing a finger on the fingerprint recognition module 1.

For example, in a case where the display module 5 displays the third image TX3, the triggering conditions for the processor 3 to send the heart rate detection instruction include the following situations.

For example, after the display module 5 displays the third image TX3 for a third set time duration (e.g., 3 s), the processor 3 sends the heart rate detection instruction to the fingerprint recognition module 1.

For another example, in a case where the display module 5 displays the third image TX3, the user touches the information collection region C with, for example, a finger, and the processor 3 obtains a time duration of the user touching the information collection region C, and in a case where the touching duration is greater than a fourth set time duration, the processor 3 sends the heart rate detection instruction to the fingerprint recognition module 1.

Before the fingerprint recognition module 1 starts to collect blood flow information, a certain preparation time is reserved for the user. During this period, the user places a finger on the fingerprint recognition module 1 and keeps touching the fingerprint recognition module 1 during the heart rate detection process. Thus, it is ensured that before the fingerprint recognition module 1 starts to collect information, a body part of the user is already placed on the fingerprint recognition module 1, thereby ensuring the accuracy of the blood flow information collected by the fingerprint recognition module 1; moreover, it is possible to effectively avoid a problem that the fingerprint recognition module starts to collect information before the user is ready caused by a case that the user accidentally touches the fingerprint recognition module 1 before starting the heart rate detection.

For example, before the processor 3 sends the heart rate detection instruction to the fingerprint recognition module 1, the processor 3 is further configured to send a timing display driving signal to the display driver 4 to control the display module 5 to display countdown information. In a case where the countdown information is 0, the processor 3 sends a heart rate detection instruction to the fingerprint recognition module 1, and the fingerprint recognition module 1 starts to collect blood flow information in the blood vessels of the user.

In this way, before the fingerprint recognition module 1 starts to collect blood flow information in the blood vessels of the user, the user may obtain the start time by watching the display image of the display module 5, so that the user can place a finger or other body part on the fingerprint recognition module 1 before the detection starts, so as to ensure the accuracy of the blood flow information collected by the fingerprint recognition module 1.

It will be noted that this is only an exemplary description and not a limitation on the present disclosure, and the specific way of sending a control instruction (e.g., the heart rate detection instruction) may be adaptively designed according to actual needs.

Figure 16:
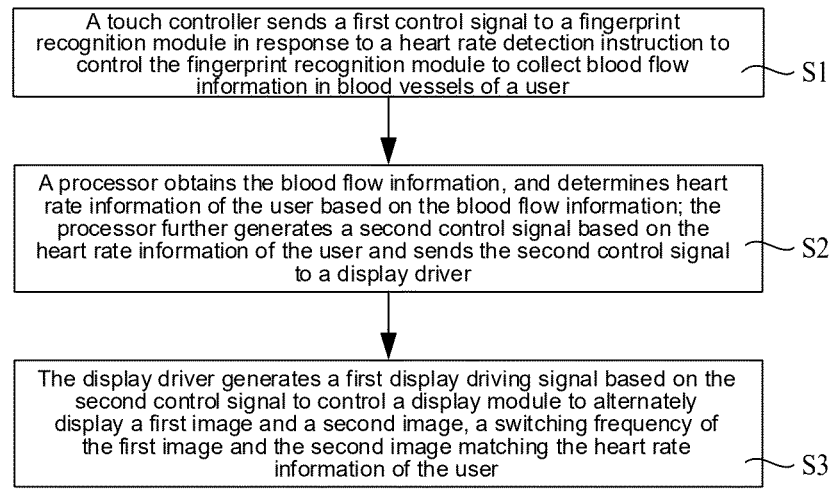
FIG. 16 is a flow chart of a heart rate detection method, in accordance with some embodiments.

Some embodiments of the present disclosure provide a heart rate detection method, and the heart rate detection method is applied to the electronic apparatus as provided in the above various embodiments. As shown in FIG. 16, the heart rate detection method includes at least steps S1 to S3.

In S1, as shown in FIG. 1, a touch controller 2 sends a first control signal to a fingerprint recognition module 1 in response to a heart rate detection instruction to control the fingerprint recognition module 1 to collect blood flow information in blood vessels of a user.

In S2, as shown in FIG. 1, a processor 3 obtains the blood flow information, and determines heart rate information of the user based on the blood flow information; the processor further generates a second control signal based on the heart rate information of the user and sends the second control signal to a display driver 4.

In S3, as shown in FIGS. 5 and 7, the display driver 4 generates a first display driving signal based on the second control signal to control a display module 5 to alternately display a first image TX1 and a second image TX2, a switching frequency of the first image TX1 and the second image TX2 matching the heart rate information of the user.

The heart rate detection method provided in some embodiments of the present disclosure may detect the heart rate of the user through a cooperation of the fingerprint recognition module 1, the touch controller 2 and the processor 3, and may enable the user to visually see the heartbeats corresponding to the heart rate information (for example, the first image TX1 and the second image TX2 being alternately displayed once corresponds to the heart beating once) during the heart rate detection process through the change in the display image (e.g., alternately displaying the first image TX1 and the second image TX2) of the display module 5; the switching frequency of the display image of the display module 5 is the same as the heartbeat frequency of the user, so that the display module 5 displays the changing rhythm of the heartbeats at a same frequency.

In comparison with displaying the heart rate test result through the display module 5 after completing the heart rate test, by adopting the heart rate detection method provided by some embodiments of the present disclosure, the display image of the display module 5 may interact with the heart rate of the user in real time, allowing the user to obtain heart rate information in real time during the heart rate detection process through the change in the display image of the display module 5, thereby optimizing the interaction effect with the user.

Figure 17:
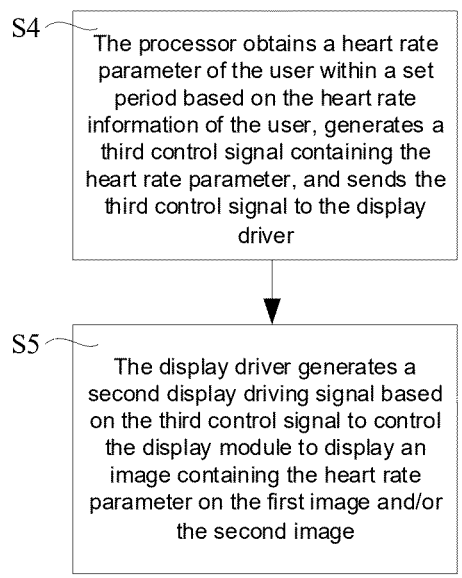
FIG. 17 is a flow chart of a heart rate detection method, in accordance with some other embodiments.

In some embodiments, as shown in FIG. 17, the heart rate detection method further includes steps S4 and S5.

In S4, the processor 3 obtains a heart rate parameter of the user within a set period based on the heart rate information of the user, generates a third control signal containing the heart rate parameter, and sends the third control signal to the display driver 4.

In S5, as shown in FIGS. 11 and 12, the display driver 4 generates a second display driving signal based on the third control signal to control the display module 5 to display an image TO containing the heart rate parameter on the first image TX1 and/or the second image TX2.

When performing the heart rate detection, it is possible to obtain the heart rate information of the user by detecting the number of heartbeats in one minute; it is also possible to deduce the number of heartbeats in one minute by detecting a duration of each heartbeat to obtain the real-time heart rate of the user. During the heart rate detection process, each set period corresponds to, for example, the time of one heartbeat, and it is possible to deduce the current real-time heart rate based on a duration of the current set period.

For example, a duration of a first set period is 1 s, and the corresponding real-time heart rate of the current user is 60 beats/minute; a duration of a second set period is 0.8 s, and the corresponding real-time heart rate of the current user is 75 beats/minute. The processor 3 may obtain the heart rate parameter of the user within a set period based on the heart rate information, and the display module 5 displays an image TX0 containing the real-time heart rate parameter under the control of the second display driving signal. In this way, during the heart rate detection process, the user may not only obtain the heart rate information through the switching frequency of the first image TX1 and the second image TX2 that are displayed by the display module 5, but also obtain the real-time heart rate information through the image TX0 containing the heart rate parameter and displayed by the display module 5.

Figure 18:
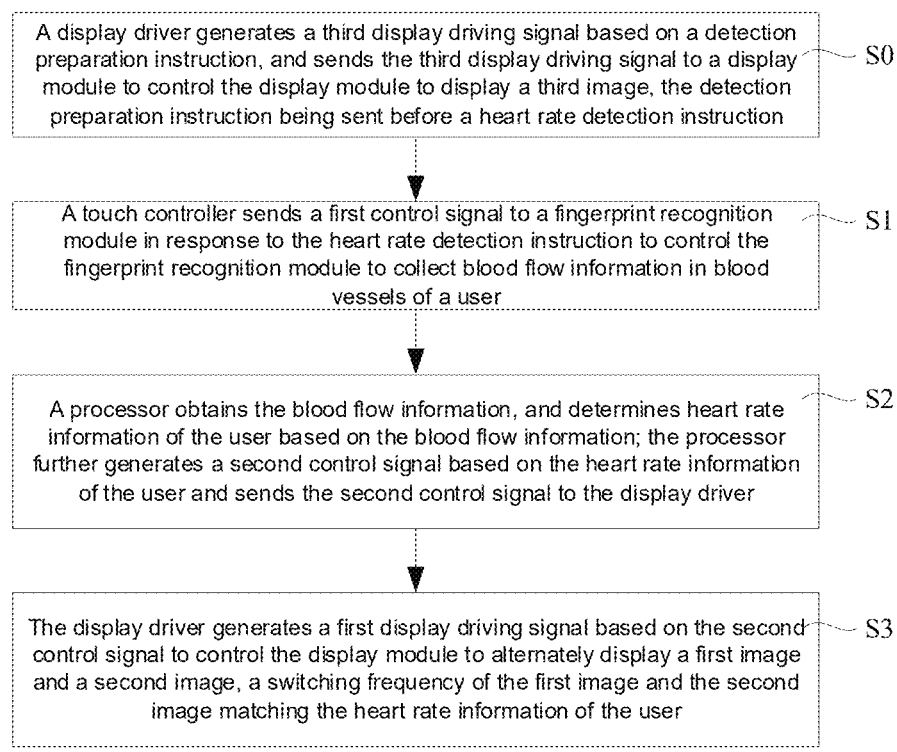
FIG. 18 is a flow chart of a heart rate detection method, in accordance with yet some other embodiments.

In some embodiments, as shown in FIG. 18, before step S1, the heart rate detection method further includes step S0.

In S0, the display driver 4 generates a third display driving signal based on a detection preparation instruction, and sends the third display driving signal to the display module 5 to control the display module 5 to display a third image TX3, the detection preparation instruction being sent before the heart rate detection instruction.

With the above technical solution, a certain preparation time is reserved for the user before the fingerprint recognition module 1 starts to collect blood flow information. During this period, the user places a finger on the fingerprint recognition module 1 and keeps touching the fingerprint recognition module 1 during the heart rate detection process. Thus, it is ensured that before the fingerprint recognition module 1 starts to collect information, the body part of the user is already placed on the fingerprint recognition module 1, thereby ensuring the accuracy of the blood flow information collected by the fingerprint recognition module.

Moreover, in a case where the display module 5 displays the third image TX3, and a time duration of the user touching an information collection region C is greater than a fourth set time duration, the processor 3 sends a heart rate detection instruction to the fingerprint recognition module 1 in response to the touching duration. In this way, it is possible to effectively avoid a problem that the fingerprint recognition module starts to collect information before the user is ready caused by a case that the user accidentally touches the fingerprint recognition module 1 before starting the heart rate detection.

For details, reference will be made to the description of the part relevant to the third image TX3 in the aforementioned content, which will not be repeated here.

In some embodiments, in step S1, collecting, by the fingerprint recognition module 1, blood flow information in the blood vessels of the user includes: collecting multiple images containing blood flow information. Based on this, the heart rate detection method further includes steps S6 to S10.

In S6, after the processor 3 determines the heart rate information, the touch controller 2 obtains a frame rate of the multiple images containing the blood flow information and sends the frame rate to the processor 3.

In S7, the processor 3 sends a vertical synchronization signal Vsync to the display driver 4, the vertical synchronization signal Vsync being used to indicate the frame rate of the multiple images containing the blood flow information.

In S8, the display driver 4 generates a negative feedback signal TE based on a refresh rate of the display module 5 and sends the negative feedback signal TE to the processor 3.

In S9, the processor 3 generates an adjustment signal based on the frame rate and the refresh rate, and sends the adjustment signal to the display driver 4.

In S10, the display driver 4 adjusts the refresh rate of the display module 5 under control of the adjustment signal, so as to cause a refresh rate of the first image TX1 and the second image TX2 that are displayed by the display module 5 to match the frame rate.

It will be noted that the above step numbers are only used to distinguish the method steps, and are not used to limit the execution order of the method steps.

As shown in FIGS. 4 and 13, the second control signal sent by the processor 3 to the display driver 4 includes an image transmission signal MIPI, and the image transmission signal MIPI includes image information containing the blood flow information. The processor 3 sends multiple images containing the blood flow information to the display driver 4 frame-by-frame through, for example, the image transmission signal MIPI, the display driver 4 sends data signals Data corresponding to the multiple images containing the blood flow information to the display module 5, and the display module 5 generates display images (the first image TX1 and/or second image TX2, and a third image TX3) frame-by-frame based on the data signals Data.

By adjusting the refresh rate of the display module 5 by the processor 3, the speed of the display module 5 processing each frame of image is made consistent with the speed of the processor 3 sending each frame of image containing blood flow information to the display driver 4. In this way, while the quality of the display image of the display module 5 may be ensured, it is also ensured that the change in display image (the switching frequency of the first image TX1 and the second image TX2) of the display module 5 is synchronize with the heart rate information of the user.

For details, reference will be made to the description of the synchronous adjustment of frame rate and refresh rate in the aforementioned content, which will not be repeated here.

Some embodiments of the present disclosure provide a computer-readable storage medium (e.g., a non-transitory computer-readable storage medium), the computer-readable storage medium is stored thereon with computer program instructions, and when executed on a computer (e.g., an electronic apparatus 10), the computer program instructions cause the computer to perform one or more steps in the steps S0 to S8 of the heart rate detection method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card, and a flash memory device (e.g., an erasable programmable read-only memory (EPROM), a card, a stick or a key driver). The various computer-readable storage media described in present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. For example, the computer program product is stored on a non-transitory computer-readable storage medium. The computer program product includes computer program instructions, and when executed on a computer (e.g., an electronic apparatus), the computer program instructions cause the computer to perform one or more steps in the steps S0 to S8 of the heart rate detection method as described in the above embodiments.

Some embodiments of the present disclosure provide a computer program. When executed on a computer (e.g., an electronic apparatus), the computer program causes the computer to perform one or more steps in the steps S0 to S8 of the heart rate detection method as described in the above embodiments.

Beneficial effects of the computer-readable storage medium, the computer program product, and the computer program are the same as the beneficial effects of the heart rate detection method as described in the above some embodiments, which will not be repeated here.

The above are only specific embodiments of the present disclosure, but the protection scope of the present disclosure is not limited thereto, and variations or substitutions that any person skilled in the art may conceive of within the technical scope disclosed by the present disclosure, should all fall within the protection scope of the present disclosure. Therefore, the protection scope of the present disclosure should be subjected to the protection scope of the claims.

What is claimed is:

1. An electronic apparatus, comprising: a fingerprint recognition module, a touch controller, a processor, a display driver and a display module; wherein the touch controller is configured to send a first control signal to the fingerprint recognition module in response to a heart rate detection instruction to control the fingerprint recognition module to collect blood flow information in blood vessels of a user;

the processor is configured to: obtain the blood flow information and determine heart rate information of the user based on the blood flow information; and generate a second control signal based on the heart rate information and send the second control information to the display driver;

the display driver is configured to generate a first display driving signal based on the second control signal to control the display module to alternately display a first image and a second image, wherein a switching frequency of the first image and the second image matches the heart rate information; and the fingerprint recognition module is configured to collect multiple images containing the blood flow information; and after the processor determines the heart rate information, the touch controller is further configured to obtain a frame rate of the multiple images containing the blood flow information and send the frame rate to the processor;

the processor is further configured to send a vertical synchronization signal to the display driver, wherein the vertical synchronization signal is used to indicate the frame rate of the multiple images containing the blood flow information;

the display driver is further configured to generate a negative feedback signal based on a refresh rate of the display module and send the negative feedback signal to the processor;

the processor is further configured to generate an adjustment signal based on the frame rate and the refresh rate; and the display driver is further configured to adjust the refresh rate of the display module under control of the adjustment signal to cause a refresh rate of the first image and the second image displayed by the display module to match the frame rate.

2. The electronic apparatus according to claim 1, wherein the first display driving signal includes multiple display periods, and each display period includes a display time of the first image and a display time of the second image; and within a display period of the multiple display periods, a display luminance of the first image is different from a display luminance of the second image.

3. The electronic apparatus according to claim 2, wherein the first display driving signal includes data signals, a ratio of each data signal corresponding to the first image to a respective data signal corresponding to the second image is same, and the ratio is not equal to 1.

4. The electronic apparatus according to claim 3, wherein a data voltage value corresponding to each data signal corresponding to the first image is different from a data voltage value corresponding to each data signal corresponding to the second image.

5. The electronic apparatus according to claim 2, wherein the first display driving signal includes light-emitting control signals, a ratio of a duty ratio of each light-emitting control signal corresponding to the first image to a duty ratio of a respective light-emitting control signal corresponding to the second image is same, and the ratio is not equal to 1.

6. The electronic apparatus according to claim 5, wherein a number of operation levels of each light-emitting control signal corresponding to the first image is not equal to a number of operation levels of each light-emitting control signal corresponding to the second image.

7. The electronic apparatus according to claim 5, wherein a duration of each light-emitting control signal corresponding to the first image is not equal to a duration of each light-emitting control signal corresponding to the second image.

8. The electronic apparatus according to claim 1, wherein within a display period, the first image and the second image display different contents.

9. The electronic apparatus according to claim 1, wherein the processor is further configured to: obtain a heart rate parameter of the user within a set period based on the heart rate information, generate a third control signal containing the heart rate parameter; and send the third control signal to the display driver; and the display driver is further configured to generate a second display driving signal based on the third control signal to control the display module to display an image containing the heart rate parameter on the first image and/or the second image.

10. The electronic apparatus according to claim 9, wherein an area of the image containing the heart rate parameter is less than an area of the first image and/or an area of the second image.

11. The electronic apparatus according to claim 9, wherein within a display period, a display luminance of the image containing the heart rate parameter remains unchanged.

12. The electronic apparatus according to claim 1, wherein the display driver is further configured to generate a third display driving signal based on a detection preparation instruction to control the display module to display a third image; wherein the detection preparation instruction is sent before the heart rate detection instruction.

13. A heart rate detection method, comprising:

a touch controller sending a first control signal to a fingerprint recognition module in response to a heart rate detection instruction to control the fingerprint recognition module to collect blood flow information in blood vessels of a user;

a processor obtaining the blood flow information and determining heart rate information of the user based on the blood flow information;

the processor further generating a second control signal based on the heart rate information and sending the second control information to a display driver; and the display driver generating a first display driving signal based on the second control signal to control a display module to alternately display a first image and a second image, wherein a switching frequency of the first image and the second image matches the heart rate information; wherein the fingerprint recognition module collecting the blood flow information in blood vessels of the user includes: the fingerprint recognition module collecting multiple images containing the blood flow information; and the method further comprises:

after the processor determines the heart rate information, the touch controller obtaining a frame rate of the multiple images containing the blood flow information and sending the frame rate to the processor;

the processor sending a vertical synchronization signal to the display driver, wherein the vertical synchronization signal is used to indicate the frame rate of the multiple images containing the blood flow information;

the display driver generating a negative feedback signal based on a refresh rate of the display module and sending the negative feedback signal to the processor;

the processor generating an adjustment signal based on the frame rate and the refresh rate; and the display driver adjusting the refresh rate of the display module under control of the adjustment signal to cause a refresh rate of the first image and the second image displayed by the display module to match the frame rate.

14. The method according to claim 13, further comprising:

the processor obtaining a heart rate parameter of the user within a set period based on the heart rate information, generating a third control signal containing the heart rate parameter and sending the third control signal to the display driver; and the display driver generating a second display driving signal based on the third control signal to control the display module to display an image containing the heart rate parameter on the first image and/or the second image.

15. The method according to claim 13, further comprising: the display driver generating a third display driving signal based on a detection preparation instruction to control the display module to display a third image; wherein the detection preparation instruction is sent before the heart rate detection instruction.

16. A non-transitory computer-readable storage medium having computer program instructions stored thereon, wherein when executed on a computer, the computer program instructions cause the computer to perform:

a touch controller sending a first control signal to a fingerprint recognition module in response to a heart rate detection instruction to control the fingerprint recognition module to collect blood flow information in blood vessels of a user;

a processor obtaining the blood flow information and determining heart rate information of the user based on the blood flow information;

the processor further generating a second control signal based on the heart rate information and sending the second control information to a display driver; and the display driver generating a first display driving signal based on the second control signal to control a display module to alternately display a first image and a second image, wherein a switching frequency of the first image and the second image matches the heart rate information; wherein the fingerprint recognition module collecting the blood flow information in blood vessels of the user includes: the fingerprint recognition module collecting multiple images containing the blood flow information; and the method further comprises:

after the processor determines the heart rate information, the touch controller obtaining a frame rate of the multiple images containing the blood flow information and sending the frame rate to the processor;

the processor sending a vertical synchronization signal to the display driver, wherein the vertical synchronization signal is used to indicate the frame rate of the multiple images containing the blood flow information;

the display driver generating a negative feedback signal based on a refresh rate of the display module and sending the negative feedback signal to the processor;

the processor generating an adjustment signal based on the frame rate and the refresh rate; and the display driver adjusting the refresh rate of the display module under control of the adjustment signal to cause a refresh rate of the first image and the second image displayed by the display module to match the frame rate.

17. The electronic apparatus according to claim 1, wherein the processor is further configured to generate and send the heart rate detection instruction.

18. The electronic apparatus according to claim 12, wherein the processor is further configured to generate and send the detection preparation instruction.

* * * * *